(12) United States Patent
Christie et al.

(10) Patent No.: US 7,782,708 B2
(45) Date of Patent: *Aug. 24, 2010

(54) SOURCE SIGNATURE DECONVOLUTION METHOD

(75) Inventors: Philip Christie, Cambridgeshire (GB); Zoe Lunnon, Devon (GB)

(73) Assignee: WesternGeco LLC, Houston, TX (US)

( * ) Notice: Subject to any disclaimer, the term of this patent is extended or adjusted under 35 U.S.C. 154(b) by 3 days.

This patent is subject to a terminal disclaimer.

(21) Appl. No.: 12/436,557

(22) Filed: May 6, 2009

(65) Prior Publication Data

US 2009/0213691 A1 Aug. 27, 2009

Related U.S. Application Data

(62) Division of application No. 11/415,033, filed on May 1, 2006, now Pat. No. 7,551,515.

(51) Int. Cl.
*G01V 1/38* (2006.01)
(52) U.S. Cl. ....................................................... 367/21

(58) Field of Classification Search .................. 367/21, 367/23, 43; 181/110, 111, 115, 118
See application file for complete search history.

(56) References Cited

U.S. PATENT DOCUMENTS 6,256,589 B1 * 7/2001 Gallotti Guimaraes ....... 702/18

* cited by examiner

*Primary Examiner*—Scott A Hughes
*Assistant Examiner*—Krystine Breier
(74) *Attorney, Agent, or Firm*—James McAleenan; Vincent Loccisano; Brigid Laffey

(57) ABSTRACT

A method of filtering seismic signals is described using the steps of obtaining the seismic signals generated by activating a seismic source and recording signals emanating from the source at one or more receivers; defining a source signature deconvolution filter to filter the seismic signal, wherein the filter is scaled by a frequency-dependent term based on an estimate of the signal-to-noise (S/N) based on the spectral power of a signal common to a suite of angle-dependent far-field signatures normalized by the total spectral power of the signatures within the angular suite and performing a source signature deconvolution using the source signature deconvolution filter.

13 Claims, 5 Drawing Sheets

SOURCE SIGNATURE DECONVOLUTION METHOD

CROSS REFERENCE TO RELATED APPLICATIONS

This application is a divisional of application Ser. No. 11/415,033, filed on May 1, 2006, incorporated by reference herein in its entirety.

BACKGROUND OF THE INVENTION

This invention relates to methods for filtering seismic signals, particularly marine seismic signals obtained by activating sources with known or measurable signatures. More specifically it relates to a filtering process using a source-signature deconvolution filter.

In seismic exploration it is known to generate seismic pulses or waves from at least one seismic source and to measure or record the wavefield using a plurality of seismic receivers. Seismic sources are either of the impulse type generating a sharp and sudden peak of wave energy or, alternatively, of the vibrating type generating a sweeping signal of ideally controlled amplitude and frequency spectrum. Marine seismic sources commonly used are impulsive sources comprising a plurality of so-called "airguns" as source elements arranged in an array to produce a combined seismic source which has more desirable characteristics than the individual source elements of the array. Marine vibratory sources exist but are less frequently used.

In use, an airgun generates a high pressure air bubble by the sudden discharge of a quantity of high pressure compressed air into the water. According to established theoretical knowledge, the elasticity of the air couples with the inertial mass of the surrounding water to produce an oscillating system as the air expands and contracts in size until its energy is dissipated in the water and the bubble reaches its equilibrium volume. These bubble oscillations generate spherical sound waves which form the seismic signal. As described below in further detail, it is known that marine seismic signals can be synchronized so as to enhance the primary pulse in an acquisition method referred to as peak-tuning, or, if the synchronization is tuned to the first bubble, bubble-tuning. The synchronization may alternatively be tuned to any other part of the composite signature of the source.

It is an important, but not necessarily desirable, feature of an array of marine seismic source elements, which form a seismic source, that the sound wave transmitted through the body of water is directional, i.e. the shape or signature of the transmitted wave varies with vertical polar angle, and azimuthal polar angle for a source not designed to be azimuthally symmetric (such special sources being described for example in United Kingdom patent GB 2376528). This is seen as a result of (i) the array having dimensions which are not negligible compared to the wavelengths of sound in the transmitted wave and (ii) the effect of the free-surface ghost reflection causing each source element to have an approximately equal and opposite virtual image source element in the free-surface mirror when observed at distances far from the source. In a given direction, the signature of a transmitted wave varies in the so-called "near field" as the distance from the array increases until at a sufficient distance from the array, in the so-called "far field", the shape of the wave remains substantially constant but the amplitude decreases, generally inversely in proportion to the distance from the array. The "far field" of an array or source generally exists at distances greater than $D^2/\lambda$, where D is the dimension of the array and $\lambda$ is the wavelength.

In U.S. Pat. No. 4,476,553 and in the European Patent EP 0066423, there is disclosed the use of an array of near-field hydrophones or pressure sensors arranged to measure the seismic signal generated by an array of airgun elements in a body of water. Each hydrophone is placed no closer than about 1 meter to an associated airgun so that the pressure measured at each hydrophone is a linear superposition of the spherical waves from all the oscillating bubbles and their reflections in the free surface. Using the hydrophone signals a synthetic source signal can be derived, the "notional source", which provides an efficient way of determining the far-field signature of the source in all angular directions.

A variant of the above known source is the TRISOR™ source used by WesternGeco Ltd. The TRISOR marine source controller enables the airgun elements to be synchronized so as to enhance the primary pulse (peak-tuning), or the first bubble (bubble-tuning) or any other part of the composite airgun signature. TRISOR also allows acquisition of data from a hydrophone located near to each airgun element. Although commonly referred to as near-field hydrophones (NFH), the trace from each hydrophone is actually in the far-field of the acoustic pressure radiated from the airgun.

In TRISOR the notional source algorithm as described in: Ziolkowski, A., Parkes, G., Hatton, L. and Haugland, T., The signature of an air-gun array—Computation from near-field measurements including interactions. Geophysics 47, 1413-1421 (1982) and in the European Patent EP 0066423 can be used to compute far-field signatures of the array as a whole directly below the marine source array, or for any take-off direction in the $2\pi$ steradians centered upon the vertical line below the acoustic centre of the array and characterized by vertical polar and azimuthal polar angles. Far-field in this context means a distance which is large compared to the scale length of the marine source array, typically 10-20 meters, or its depth of immersion, typically 5-20 meters, so that while the composite signature shape is independent of distance, it may still vary with direction.

U.S. Pat. No. 5,247,486 describes a method for determining a far-field signature of a plurality of seismic source elements measuring a near-field signature of each seismic source element. In a preliminary stage an initial near-field signature of each seismic source element and an initial far-field signature of the plurality of N seismic source elements are measured simultaneously. An operator is determined to calculate subsequent far-field signatures.

WO-2004068170-A1 provides a method and apparatus for directional de-signature of a seismic signal. The method includes forming a plurality of far-field signatures representative of a plurality of seismic signals having a plurality of take-off angles, associating a plurality of traces representative of a plurality of reflections of the seismic signals with the plurality of far-field signatures, and forming a plurality of de-signatured traces from the plurality of traces and the plurality of associated far-field signatures.

EP-A-0,400,769 discloses an array of air guns with near-field hydrophones mounted 10 to 15 cm from the gun ports (i.e. in the non-linear zone) and EP-A-0,555,148 discloses a method of predicting wave signatures.

A known seismic source airgun made by Bolt Technology Corporation is disclosed in U.S. Pat. No. 4,240,518 and incorporates a stainless steel pressure sensor, known as the BSS, which is mounted within the airgun to measure the pressure inside the gun. With an array of airguns making up a seismic source it is important to ensure that all the guns fire at the same time and the signals from the pressure sensors on the different guns are used not only to measure the firing instant, or "time-break", of each gun but are also used as input to the gun controller, which adjusts the timing of the firing commands to the individual guns.

Further details of the techniques and advantages of bubble-tuning are described by Avedik, F., Renard, V., Allenou, J. P., and Morvan, B., *Single Bubble Air-Gun Array For Deep Exploration, Geophysics* 58, 366-382 (1993) and in the French patent application FR-A-2,702,281. A further study on the topic of bubble-tuning can be found in: Lunnon, Z., Christie, P., and White, R., (2003). *An Evaluation Of Peak And Bubble Tuning In Sub-Basalt Seismology: Modelling And Results From OBS Data*, First Break, 21(12), 51-56 (2003).

An optimal deconvolution filter using semblance-weighted deconvolution is described in: Haldorsen, J., Miller, D. and Walsh, J., *Multichannel Wiener Deconvolution Of Vertical Seismic Profiles*: Geophysics, Soc. of Expl. Geophys., 59, 1500-1511 (1994). The method is used for estimating an optimal signature from a plurality of depth-dependant source signatures.

Because the path length from the marine source through the earth to the receivers is also large compared to the array dimension, the source is often approximated as a point and the vertically-downward, far-field signature is commonly taken as the signature for shaping the seismic data either to minimum phase or sometimes to zero phase. In fact, far-field signatures vary with the vertical and azimuthal polar angles from the array centre, but for the majority of conventional surveys, utilizing peak-tuned sources and vertical polar angles below 30°, the effect is small. However, in Christie, P., Langridge, A., White, R., Lunnon, Z., Roberts, A. W. and the iSIMM team, (2004). "*Isimm Looks Beneath Basalt For Both Industry And University Research*", Ext. Abs. 87 presented at 5th Petroleum Geophysics Conference, Hyderabad, India, a deep-towed source is tuned on the first bubble to provide a signature rich in low frequencies for sub-basalt penetration. While a high quality section has resulted from a processing flow based upon sub-critical offsets, it is observed that bubble-tuned signatures can vary more rapidly with the vertical polar angle than peak-tuned signatures. The present invention is partly motivated by this observation.

The strong variation of the bubble-tuned signatures with the vertical polar angle is a problem in source signature deconvolution of recorded seismic data when debubbling the mixed-phase bubble-tuned signature and shaping it to zero phase. Significant pre-cursor energy can be created by the deconvolution causing noise at higher offsets. The pre-cursor energy results from the variation with angle of the notch depths and frequencies of the bubble-tuned signature. After deconvolution by an operator designed as known from the vertically-downgoing signature, the spectral whitening amplifies energy in the signature spectra at higher angles.

Whilst it is possible to use an angular-dependent deconvolution to improve the process (e.g.: van der Schans, C. and Ziolkowski, A. M., 1983, *Angular-Dependent Signature Deconvolution*, 53rd Ann. Internat. Mtg: Soc. of Expl. Geophys., Session:S13.3), the amount of additional processing required makes this approach currently not economically viable. The present invention, therefore, seeks to provide an efficient method for the source signature deconvolution of recorded seismic data, the method being applicable to a wider range of polar or take-off angles.

SUMMARY

According to an aspect of the invention, there is provided a method of filtering seismic signals including the steps of:

obtaining the seismic signals generated by activating a seismic source;

obtaining far-field source signature signals of the seismic source for a plurality of polar angles;

defining a source signature deconvolution filter to filter the seismic signal, wherein the filter is weighted by a frequency-dependent weighting term being indicative of the signal-versus-noise content of source signature signals and being derived using at least two of the far-field source signature signals; and performing a source signature deconvolution using the source signature deconvolution filter.

The one or more seismic sources are sources with a measurable or otherwise known source signature, more preferably marine impulse sources. For the purpose of the invention the sources can be single sources or—as it is more common in the industry—clusters of single source elements. The receivers to record the seismic signals are typically velocity sensors, acceleration sensors or pressure sensors, often referred to in the industry as geophones, accelerometers and hydrophones, respectively. In the marine seismic environment, the signals are often obtained using streamers and storing the recorded data on board the seismic vessel towing the streamers or via a data link in a land-based data processing facility.

The far-field signatures required to derive the weighting term can be either measured or calculated or taken from a suitable repository of signatures with different polar angles. If, as it is preferred, the far-field signatures are calculated from near-field measurements, methods known per se can be employed to derive the far-field signatures from such near-field measurements.

The deconvolution performed by the filter or operator of the present invention is a source signature deconvolution, which is designed to remove the effects of the source signature from the obtained seismic data. The source signature deconvolution is preferably done at an early stage within the seismic data processing chain, i.e. preferably prior to steps such as velocity analysis, moveout corrections, removal of multiples, stacking, migration and imaging. The filter is preferably applied to single traces of the seismic data, more preferably to such traces as representing the output of single seismic receivers prior to group-forming such single sensor recordings.

The invention includes the use of a deconvolution filter to filter the seismic signal, wherein the filter is weighted by a term preferably based on an average spectrum of the far-field signatures of the seismic source over a range of vertical or azimuthal polar angles. Preferably the weight is calculated using a ratio of an estimate of the spectral power in the far-field signatures signals and an estimate of total power of the far-field signatures signals.

As such the operator can be applied to the recorded signals in the time domain using a convolutional step, or as simple multiplication in the frequency, or Fourier-transform, domain.

The deconvolution filter according to the invention includes an element or term derived or determined by combining at least two source signatures with different vertical or azimuthal polar angles. The preferred step of combining the at least two signatures is in a form of a normalized average or any mathematically similar term such as median. An even more preferred combination is a frequency-domain semblance operator which can be applied to the seismic signals transformed into the frequency domain. Alternatively the operator can be transformed into the space-time domain and applied as filter to the offset traces as recorded. For the sake of brevity, the terms filter and operator may be used interchangeably within this description.

The method according to the present invention can be further improved by low-pass filtering the seismic signal to a maximum frequency of up to or less than the first ghost notch caused by destructive interference with the wave signals as reflected from the free surface. This frequency is that at which the depth of the deeper of the source or the receiver cables or streamers towed during a marine seismic acquisition corresponds to one-half a wavelength.

These and further aspects of the invention are described in detail in the following examples and accompanying drawings.

BRIEF DESCRIPTION OF THE DRAWINGS

The invention will now be described, by way of example only, with reference to the accompanying drawings, of which.

DETAILED DESCRIPTION

Figure 1A:
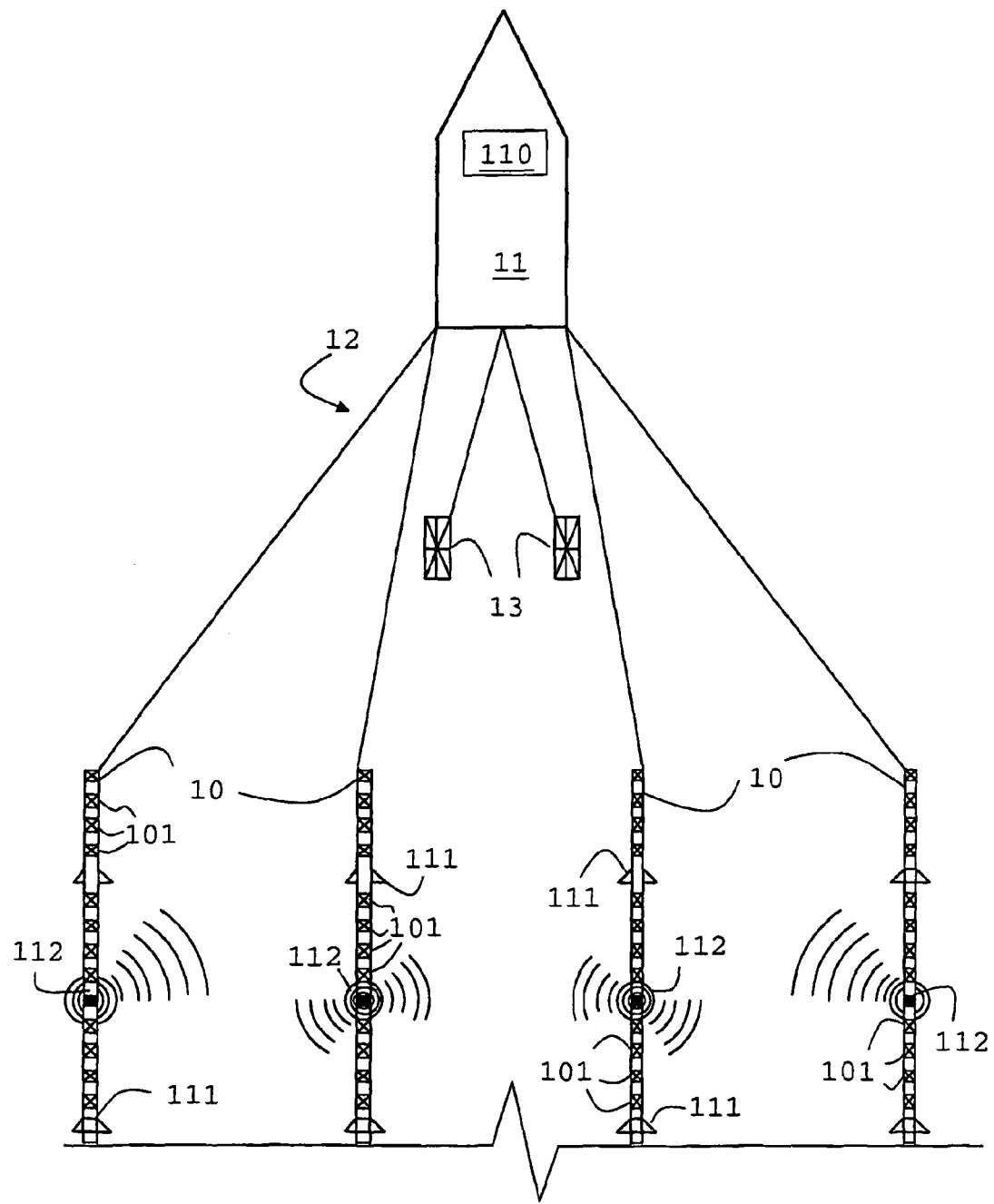
FIGS. 1A-1C show a schematic illustration of equipment for seismic data acquisition in a marine environment.

A typical marine seismic acquisition is illustrated in FIG. 1A. Four instrumented cables or streamers 10 are towed by a ship 11. A front network 12 and similar tail network (not shown) is used to connect the vessel and the streamers. Embedded in the front network are seismic sources 13, typically an array of airguns. Each airgun is accompanied by a near-field hydrophone (as shown in FIG. 1C below). Each streamer 10 is typically assembled from many hydrophone holder segments carrying hydrophones 101. Between segments, the streamers carry controllable deflectors 111 (often referred to as vanes or "birds") and other aids for steering the streamer along a desired trajectory in a body of water. The accurate positioning of modern streamers is controlled by a satellite-based positioning system, such as GPS or differential GPS, with GPS receivers at the front and tail of the streamer. In addition to GPS based positioning, it is known to monitor the relative positions of streamers and sections of streamers through a network of sonic transceivers 112 that transmit and receive acoustic or sonar signals.

Figure 1B:
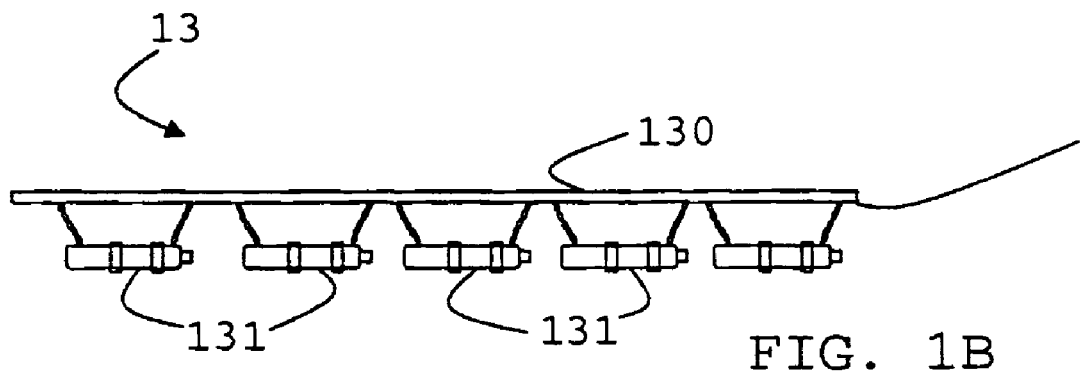
Figure 1C:
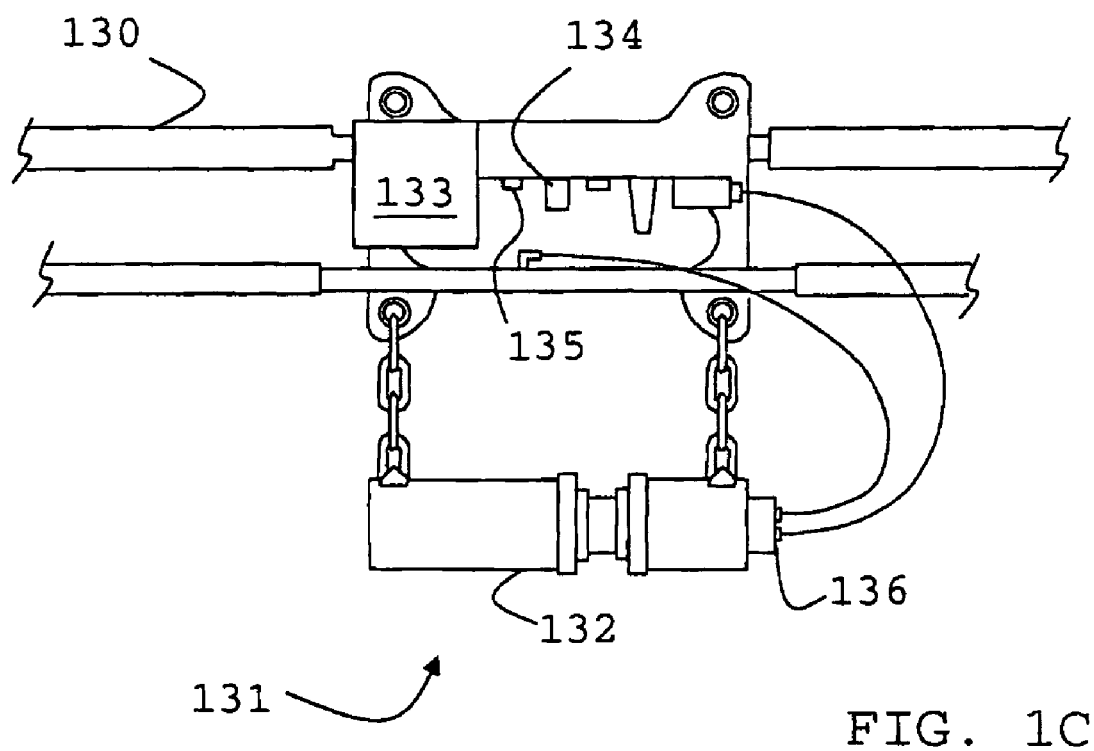

In FIGS. 1B and 1C the marine source 13 is shown in greater detail. The seismic survey vessel 11 tows a marine source 13 which typically includes a suspension system 130 carrying a plurality of airguns 131, which generate superposed acoustic waves (not shown) in the water that travel in all directions including both towards the sea bed and towards the free surface (also not shown), from which such waves are reflected down again, creating so-called ghosts of each airgun source.

Figure 2A:
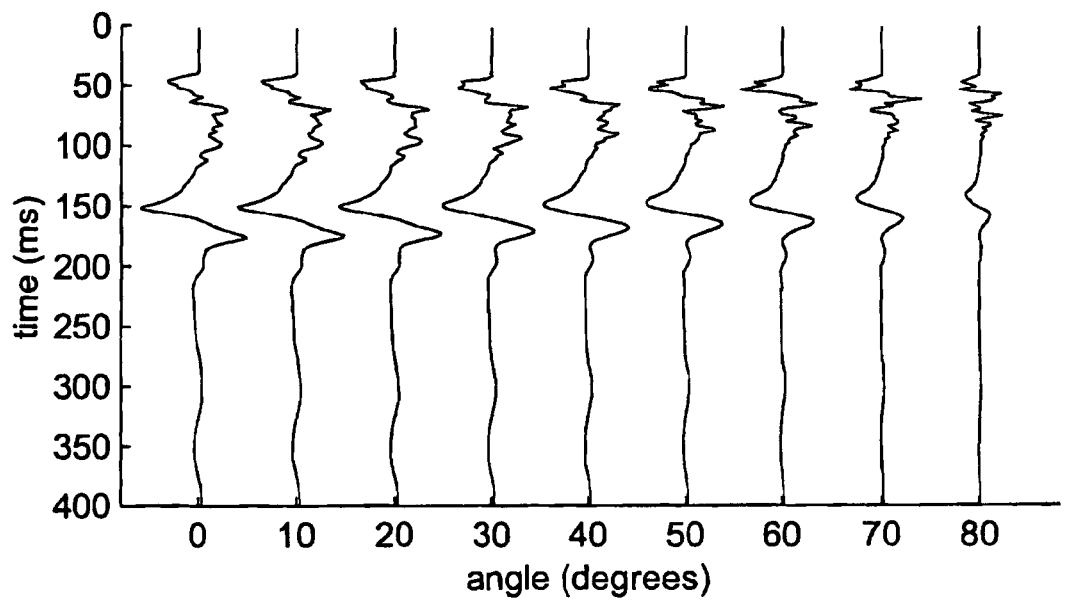
FIGS. 2A-2C illustrate the effects of non-optimal source deconvolution.

In FIG. 1C a single airgun 131 is shown in greater detail: The airgun is a calibrated marine source with a body 132 made of a Bolt-type airgun. The suspension system 130 includes data transmission cables. The airgun body 132 is connected to a data digitizer and source controller 133. The near-field hydrophone 134 captures transient pressure information to estimate the notional source signature. The plurality of near-field hydrophones may be used to compute a plurality of notional source signatures. Knowledge of the notional source signatures in turn is used to calculate far-field signatures in any desired direction such as the far-field signatures for a plurality of vertical polar angles as illustrated in FIG. 2A.

Additional information is obtained from a depth sensor 135 and a gun sensor 136.

In the shown example, the seismic sources 13 are airguns or clusters of airguns. However, the present invention is not so limited. In alternative embodiments, the seismic sources 13 may be any device capable of generating the desired acoustic wave, such as piezoelectric devices, cavitational water guns, and the like.

In operation, the seismic sources 13 impart an acoustic wave through the water and into the ocean floor. The acoustic wave reflects and refracts from various structures (also not shown) within the sea bed and above the seabed, and the reflected and/or refracted wave (also not shown) is detected by the receivers 101 in the streamer 10.

It should also be appreciated that, in one embodiment, the seismic streamer 10 may be an ocean-bottom cable ("OBC"), or other sensing device located on the seabed. OBCs may be deployed on the seafloor to record and relay data to the seismic survey vessel 11.

A signal processing unit 110 is provided to process the analogue and/or digital signals that are generated by the receivers 101 and the source data. Although not required for the operation of the present invention, it will be appreciated by those of ordinary skill in the art that the signal processing unit 110 may comprise a data collection unit (not shown) and a data processing unit (also not shown). In one embodiment, the signal processing unit 110 is deployed on the seismic survey vessel 11. However, it will be appreciated by those of ordinary skill in the art that portions of the signal processing unit may be located in any desirable location, including, but not limited to, other vessels (not shown) and on-shore facilities (not shown). For example, in one embodiment, the data collection unit may be deployed on the seismic survey vessel 11 and the data processing unit may be deployed at a remote on-shore facility.

Figure 2B:
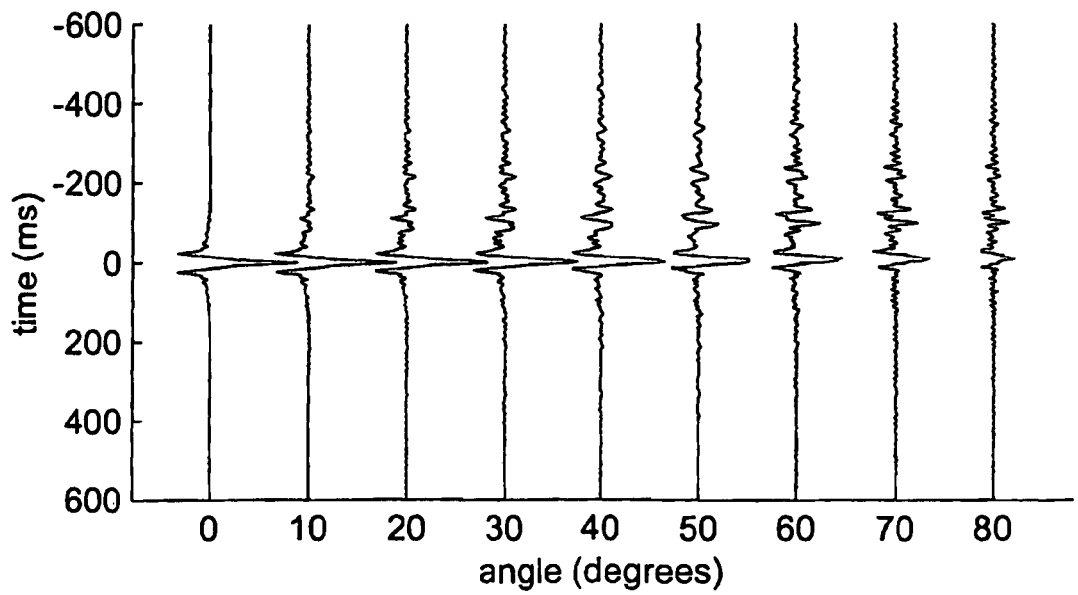
Figure 2C:
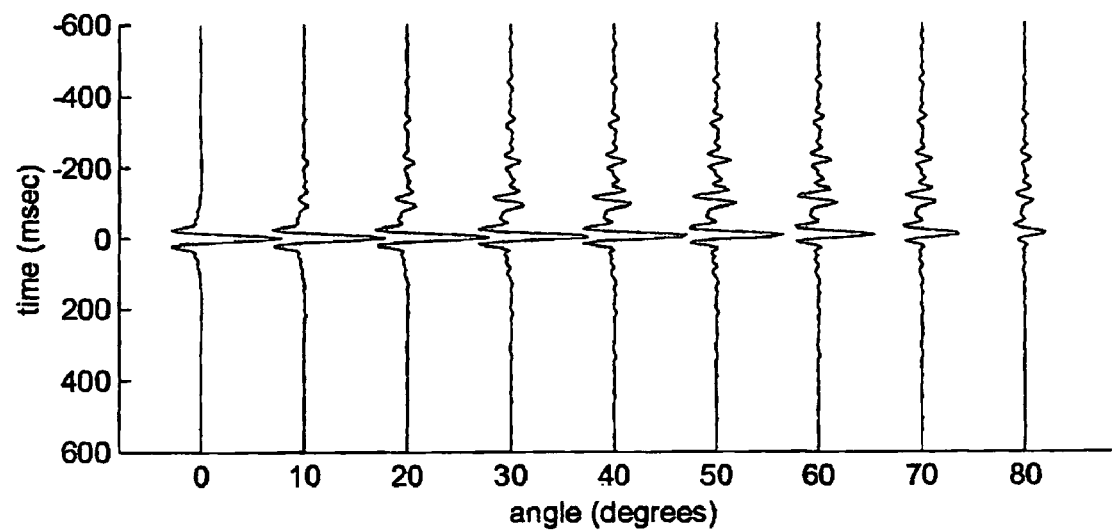

In FIG. 2A, there are shown a suite of bubble-tuned far-field signatures as a function of take-off angle as computed using the near-field measurement and methods described for example in Geophysics 47, 1413-1421 (1982) and in the European Patent EP 0066423 cited above. The vertical downward direction is at zero angle and, in this example, angle increases for directions away from vertical to the rear of the vessel. Using a debubbling zero-phase deconvolution based on the zero angle signature yields the graph of FIG. 2B. The graph shows how with increasing angle the deconvolution spreads energy from the main peak into negative (pre-arrival) times. This precursor energy potentially overlays desired seismic signals arriving at non-zero offsets and hence may prevent accurate interpretation of seismic data. As shown in FIG. 2C, the precursors are not removed by applying a 41 Hz low-pass filter to remove frequencies above the first ghost notch from the signal of FIG. 2B.

To overcome this problem a frequency-domain, semblance-weighted deconvolution is applied based on a method developed for vertical seismic profiling (VSP) of wellbore data. The method is a multi-channel approach in estimating the frequency-domain semblance from a depth window of VSP traces time-aligned to their first breaks. The semblance is the power spectrum of the estimated common signal within a group of N traces divided by the average power spectrum of the same N traces: the following equations, equations 1 to 3, are adapted from equations 16, 17 and 15 respectively in Haldorsen et al. (1994).

$$F(\omega) = \frac{\hat{f}^*(\omega)}{|\hat{f}(\omega)|^2} S(\omega) \quad [1]$$

where $$S(\omega) = \frac{|\hat{f}(\omega)|^2}{E_T(\omega)} \quad [2]$$

and $$E_T(\omega) = \frac{1}{N} \sum_{n(\alpha)=1}^{N} |s_{n(\alpha)}(\omega)|^2 \quad [3]$$

where $F(\omega)$ is the frequency-domain, semblance-weighted deconvolution operator; $\hat{f}(\omega)$ can be identified as the frequency-domain "common signal" within the angular range using (i) the trace at or close to a reference angle for processing; (ii) a mean of traces within the desired angular range; or (iii) a trace estimated from median average or other estimate of the signal common to a windowed suite of N traces spanning a range of take-off angles $\alpha$, understood to encompass vertical polar and/or azimuthal polar angles as appropriate.

For example the common trace in the Fourier-domain can be expressed as:

$$\hat{f}(\omega) = s_{(\alpha)}(\omega) \text{ as in } (i), \text{ or} \quad [4]$$

$$\hat{f}(\omega) = \frac{1}{N} \sum_{n(\alpha)=1}^{N} s_{n(\alpha)}(\omega) \text{ as in } (ii). \quad [4']$$

The "*" symbol denotes complex conjugation; $S(\omega)$ is the frequency domain semblance, and $E_T(\omega)$ is the average power spectral component across the window of N traces, $s_{n(\alpha)}(\omega)$, in the frequency domain. In the equations above, the averages for signatures or power spectra can be replaced by similar estimators such as the median.

From the above, it can be seen that the deconvolution operator, $F(\omega)$ is a spiking deconvolution filter weighted by the semblance function, $S(\omega)$, which varies from 0 (no signal) to 1 (no noise) according to the signal to noise ratio estimated frequency-component by frequency-component. As described in Haldorsen et al. (1994) the spiking deconvolution operator has the tendency to whiten a coloured signal spectrum. The semblance function which is a measure of the deconvolved signal energy as explained by Haldorsen et al. (1994), acts as a data-adaptive band-limiting filter attenuating the amplification of the spiking deconvolution at frequencies where the signal-to-noise (S/N) ratio, is low. The above described method can be applied to the deconvolution of marine seismic data, particularly bubble-tuned seismic data, by identifying the signal to be deconvolved, $\hat{f}(\omega)$, as one of the suite of angular-dependent, far-field signatures over the angular range of interest, or as an estimate of the common signal within the angular range of interest. The semblance term $S(\omega)$ in $F(\omega)$ limits the amplification, in other angular spectra, of frequency components corresponding to spectral minima in $\hat{f}(\omega)$, a consequence of the observed change in amplitude and frequency of these minima with angle, especially in bubble-tuned signatures.

The filter can alternatively be implemented as a single-step process or as a cascaded filter using the spiking filter or unweighted deconvolution operator followed by the semblance weighting.

Figure 3:
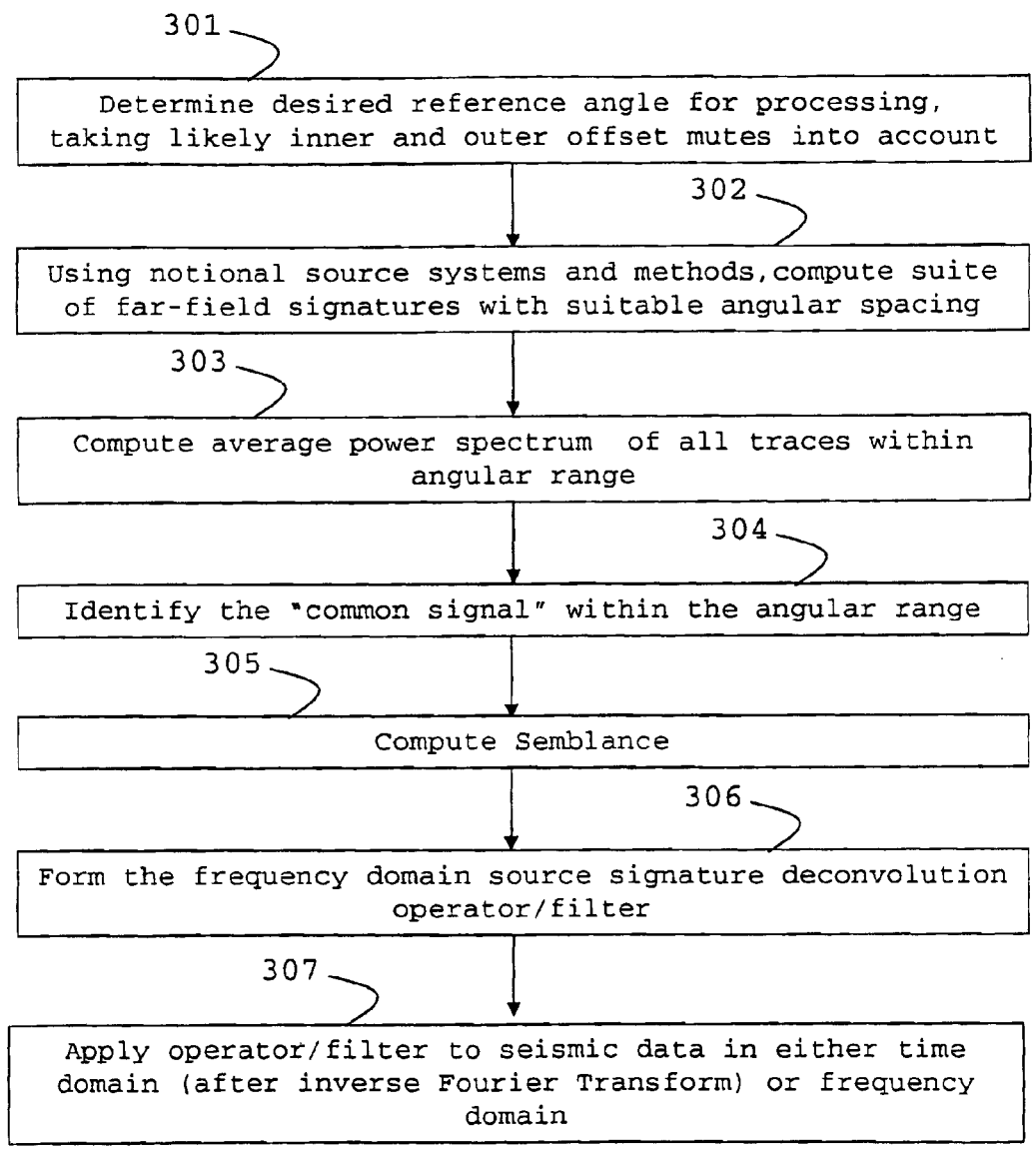
FIG. 3 is a flowchart of steps performed in an example of the present invention.

The steps of applying the above method to marine seismic acquisition may include the steps listed in FIG. 3

The notional-source signatures for arbitrary angles can be derived by known methods, in particular using methods described in EP-A-0066423. If a direction of interest and hence an angle is defined, a suite of far-field signatures such as shown in FIG. 2A can be generated using the above methods by processing the near-field hydrophone traces in accordance with the notional source algorithm. Alternatively to an in-situ measurement, pre-recorded near-field, or even far-field source signature signals or traces spanning the angular range of interest can be used.

Referring now to FIG. 3, steps are described of an example of a method in accordance with the present invention. The sequence of the steps as illustrated and described below does not necessarily reflect their temporal order.

After a reference angle or "look-direction is defined (Step 301), taking into account the likely inner and outer offset mutes or as already predetermined by the survey geometry and geological setting, an estimated range of vertical polar and/or azimuthal take-off angles, $\alpha$, can be derived for the recorded seismic data using offsets, target depths and an approximate velocity model (Step 302). If not established from predetermined values, notional source methods as known can be employed to determine a range of far-field signatures from the near-field signatures. The selection of the suitable number of far-field signatures and the angular spread of the selected signatures span are a matter of design choice and computational efficiency. The angle of interest is preferably included in the angular spread, and it may even be advantageous to select the traces such that the angle of interest is close to the central traces. The traces may be separated by about 10 degrees, but it is ultimately more preferable to select the angular spacing of the calculated far-field signatures on the rate at which such signatures change.

Then, Fourier Transforms for the angular signature within the selected angular range are performed and the values of the above defined averaging operators are calculated in accordance with equations [1]-[4] above., including calculating the average power of all far-field signature traces within a window which may include all or a subset of the traces defined above (Step 303). To establish a representative of the S/N value, the traces are processed to determine their common components (Step 304). The common signal is taken as a measure of the true signal without noise components. In Step 305, the determined parameters are combined to the frequency-domain semblance $S(\omega)$ which is the weighting term of the full source signature deconvolution operator (Step 306).

The far-field signatures are best convolved or filtered using a ghost operator corresponding to the depth at which the marine streamers are towed during the acquisition, understanding that this step may be omitted or adapted for the case of seabed receivers.

The frequency domain deconvolution operator $F(\omega)$ is then applied to the seismic data in either the time domain (after inverse Fourier Transform) or the frequency domain, according to preference or efficiency (Step 307).

The resulting deconvolved data may be further subjected to a low pass filter having a pass zone below the first ghost notch.

Figure 4:
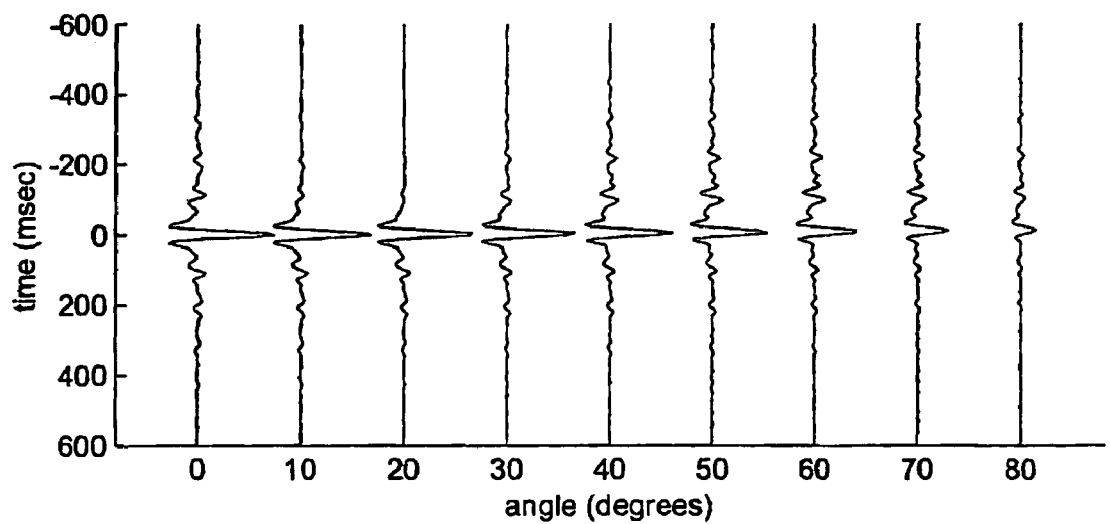
FIG. 4 illustrates a source deconvolution in accordance with an example of the invention.

In the example in FIG. 4, f(ω) is chosen to be the 15° trace (not shown in FIG. 2A, but similar in character to the 10° and 20° traces). For the example of FIG. 4, $E_T(\omega)$ is computed from the power spectra of traces in the range 0-30°. The distribution with angle of the side-lobe amplitude is reduced, more uniform and better suiting a long-offset processing flow in which an inner mute is applied for demultiple. Selection of the angular-dependent far-field signatures to include in the semblance-weighting operator allows optimization of the deconvolution for a desired range of angles.

Once shot-by-shot variations have been removed to shape to a common field signature, only a single filter design and application process is required, using the angular-dependent signatures estimated by the Notional Source algorithm. While the deconvolution is sub-optimal for angular signatures other than that defined as the target signal, it is stable with respect to angular variations in the spectral coloration of the far-field signatures. The semblance-weighted deconvolution using angular-dependent far-field signatures to estimate spectral semblance is more robust over offset than deconvolving all offsets with a single, vertically-downgoing far-field signature and requires considerably less resources to apply than full, angle-dependent deconvolution. It can be further optimized in allowing optimal deconvolution to be designed for a particular take-off angle (e.g. by selecting the window of the N trace around such an angle) and does not require a white noise parameter to be selected or tested as other known methods.

Although the example above is applied specifically to the colored, mixed-phase spectrum of the bubble-tuned signature, it could be a robust, inexpensive approach to address angular-dependent deconvolution of peak-tuned signatures as well. In peak-tuned signatures, the first significant spectral notch almost always corresponds to that of the ghost. Semblance-weighted deconvolution should limit the spectral amplification over this notch as well and might offer a robust way to shape the wavelet through the ghost notch.

The invention claimed is:

1. A method of filtering seismic signals comprising the steps of obtaining the seismic signals generated by activating a seismic source;

obtaining far-field source signature signals of the seismic source for a plurality of polar angles;

defining a source signature deconvolution filter to filter the seismic signal, wherein the filter is weighted by a frequency-dependent weighting term being indicative of the signal-versus-noise content of source signature signals and being derived using two or more of the far-field source signature signals; and performing a source signature deconvolution using the source signature deconvolution filter.

2. The method of claim 1 wherein the two or more far-field source signature signals are centered upon a polar angle.

3. The method of claim 1 wherein the seismic source includes airguns.

4. The method of claim 1 wherein the source includes airguns with near-field recording devices.

5. The method of claim 3 wherein the far-field source signatures are based on near-field measurements synchronized to a bubble as generated by the individual airguns.

6. The method of claim 1 further including the step of low pass filtering the seismic signal to a maximum frequency of less than that at which the depth of the deeper of the source or receiver cables or streamers towed during a marine seismic acquisition corresponds to one-half a wavelength.

7. The method of claim 1 wherein the deconvolution is performed in the frequency domain.

8. The method of claim 1 wherein the weighting term of the deconvolution filter is frequency-domain semblance.

9. The method of claim 1 wherein the weighting term includes a term based on an spectral estimate of the signal content common to the two or more of the far-field source signatures.

10. The method of claim 1 wherein the weighting term includes a term representing an estimate of the total spectral power of two or more far-field source signatures.

11. The method of claim 1 wherein the weighting term includes a term based on an spectral estimate of the signal content common to the two or more of the far-field source signatures and a term representing an estimate of the total spectral power of two or more far-field source signatures.

12. The method of claim 1 wherein the polar angles are vertical polar angles.

13. Signal processing equipment adapted to perform a method in accordance with claim 1.

* * * * *